United States Patent Office 3,801,662
Patented Apr. 2, 1974

3,801,662
PRODUCTION OF ANTHRACENE FROM 2-METHYL DIPHENYL METHANES IN PRESENCE OF SULFUR
Hermann Wolz, Leverkusen, Rupert Wenzel and Manfred Martin, Cologne, and Gerhard Scharfe, Leverkusen, Germany, assignors to Bayer Aktiengesellschaft, Leverkusen, Germany
No Drawing. Filed Apr. 12, 1973, Ser. No. 350,571
Claims priority, application Germany, Apr. 14, 1972, P 22 18 004.7
Int. Cl. C07c 5/18, 15/28
U.S. Cl. 260—668 F    10 Claims

ABSTRACT OF THE DISCLOSURE

In the preparation of anthracenes by the thermal conversion of a 2-methyl diphenyl methane, the improvement which comprises effecting the thermal conversion in the presence of a small amount of sulfur in elementary or combined form. The temperature is preferably about 400 to 800° C. and the sulfur may be organic or inorganic, e.g. sulfur vapor or carbon disulfide.

---

The present invention relates to a process for the thermal conversion of diphenyl methanes to anthracenes.

It is already known to prepare anthracene from benzyl toluene in the gas phase at an elevated temperature (Berichte der Deutchen Chemischen Gesellschaft, 5, 1071 (1872). In this process, which is carried out in a reaction tube heated to a high temperature, benzyl toluene is partially reacted to anthracene. In this process carbon deposits occur on the walls of the reaction tube. Carbon forms to a particularly pronounced degree when iron-containing materials, e.g. steel, are used for the reaction tube. These carbon deposits lead to mechanical difficulties due to clogging considerably impair the selectivity of the reaction and render continuous performance of the reaction over a longer period of time impossible.

It is accordingly an object of the invention to provide a process for producing anthracenes from 2-methyl-diphenyl methanes which can be carried out substantially continuously and with high yields.

It has now been found that in the preparation of anthracenes by the thermal conversion of a 2-methyl diphenyl methane, the deposit of carbon can be completely avoided by effecting the thermal conversion in the presence of a small amount of sulfur in elementary or combined form.

The most varied kinds of sulfur compounds are suitable for the addition of sulfur in combined form to the starting product. Volatile sulfur compounds are preferably used. Inorganic sulfur compounds can be employed, for example carbon disulfide, hydrogen sulfide, sulfur dioxide. As organic sulfur compounds there may be mentioned for example: thiols, such as methyl mercaptan, ethyl mercaptan, n-propyl mercaptan, iso-propyl mercaptan, n-butyl mercaptan, iso-butylmercaptan, iso-butenyl mercaptan, tert.-butyl mercaptan, n-dodecyl mercaptan, allyl mercaptan, benzyl mercaptan, ethane dithiol, monothioglycol; thiophenols, such as thiophenol, thio-o-cresol, thiosalicylic acid; thioethers, such as diethyl sulfide, dipropyl sulfide, ethyl propyl sulfide, thiodiglycolic acid, diallyl sulfide, allyl-β-oxyethyl sulfide, β-naphthyl-n-hexyl sulfide, thiocyclopentane, thiocyclohexane, ethylene sulfide; disulfides, such as diethyl disulfide, methylethyl disulfide, diallyl disulfide, diphenyl disulfide, dithioglycolic acid, dioxy-diethyl disulfide, cystine; organic polysulfides, such as ethyl hydrogen trisulfide, diphenyl trisulfide, di-o-tolyl trisulfide, amyl tetrasulfide, dibenzyl pentasulfide; sulfonic acids and their derivatives, such as benzene sulfonic acid, p-toluene sulfonic acid, p-phenol sulfonic acid, p-aniline sulfonic acid (=sulfanilic acid), methane disulfonic acid, isethionic acid; sulfones such as di-n-butyl sulfone, diacetonyl sulfone, 4-methyl-diphenyl sulfone; sulfoximines, such as dimethyl sulfoximine; sulfenic acids and their derivatives; sulfinic acids and their derivatives, such as benzene sulfinic acid, ethane sulfinic acid, p-toluene sulfinic acid; sulfoxides and their derivatives such as diphenyl disulfoxide, diethyl sulfoxide, tetraphenyl sulfur; sulfinimines; trialkyl sulfonium salts, such as triethyl sulfonium ethyl sulfate; thiosulfonic acid esters, such as benzene thiosulfonic acid phenyl ester; thiosulfinic acid ester; thioaldehydes, such as trithioformaldehyde; thioketones, such as thiobenzophenone, thiocyclopentanone; monothioacetals, such as α,β'-dialkoxydiethyl sulfide; mercaptals, such as diethylacetone mercaptal; mercaptols, such as benzildiphenyl mercaptol; sulfur-containing heterocycles, such as thiophenes, thiotoluenes, thioxenes, thionaphthene, thiophthene, azathiophenes (diazathiophenes), trithiones (e.g. 4,5-dimethyl-trithione), thiopyrones, thiazines, thioxanthrene, thianthrene; thiocarboxylic acids and their derivatives, such as thioacetic acid, thiobenzoeic acid, dithiobenzoic acid, thioformamide; thiocarbonic acid derivatives, such as carbon disulfide, carbon oxysulfide, thiocyanic acid; isothiocyanic acid, dithiocyanogen, thiocyano phenyl thiocyanogen, thiocarboxylic acid ester, xanthogenic acid derivatives, thiourethanes, dithiocarbamic acid, thiourea, isothiourea, thiuram sulfide.

Suitable concentrations of sulfur or sulfur compounds, calculated as elementary sulfur, are 0.001 to 1, preferably .01 to 0.1% by weight based on the diphenyl methane used.

The sulfur-containing substances can be added to the starting product in different forms. They can be admixed in gaseous or liquid form with the initial diphenyl methanes. Solutions of the solid, liquid or gaseous sulfur compounds can likewise be prepared in the starting product and added in metered quantities by means of a pump to the main stream of diphenyl methanes. Volatile sulfur compounds can also be conducted in gaseous forms into the initial stream.

The sulfur-containing compounds can be directly introduced into the starting product prior to evaporation of the diphenyl methanes, or they can be directly introduced into the evaporator or into the gaseous stream of the diphenyl methanes after evaporation. The sulfur-containing compounds can also be directly introduced into the reaction space.

The liquid or solid sulfur compounds are preferably dissolved in the starting product or violatile substances are added in metered quantities into the gaseous starting stream after evaporation. Elementary sulfur in liquid form can be injected into the gaseous starting stream.

As diphenyl methane derivatives for the process according to the invention there may be employed compounds of the general formula

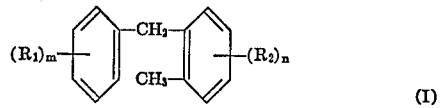

(I)

wherein $R_1$ and $R_2$ each independently is alkyl, aryl or aralkyl,
$m$ is an integer from 0 to 5, and
$n$ is an integer from 0 to 4, anthracenes being formed having the general formula

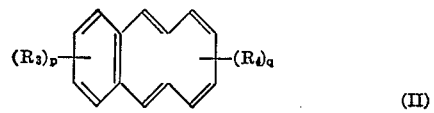

(II)

wherein

R₃ and R₄ each independently is alkyl, aryl or aralkyl, and p and q each independently is an integer from 0 to 4.

Possible radicals R₁ to R₄ are, for example, hydrocarbon radicals with up to 12 C atoms, e.g. alkyl radicals such as, methyl, ethyl, n-propyl, iso-propyl, n-butyl, isobutyl, tert.-butyl, n-pentyl, iso-pentyl, 2-methylpentyl, 3-methylpentyl, n-octyl, iso-octyl as well as cyclohexyl; aryl radicals, such as phenyl, 2-methylphenyl, 4-methylphenyl, naphthyl; aralkyl radicals, such as benzyl, phenylethyl, phenylpropyl, phenylbutyl. The hydrocarbon radicals R₁, R₂, R₃ and R₄ preferably stand for a methyl group.

Within the class of compounds of the Formula I diphenyl methane derivatives are especially preferred wherein R₁ and R₂ are methyl and m and n are 0 or 1, whereby R₃ and R₄ are methyl and p and q are 0 to 1.

As diaryl methanes there may be mentioned for example:

2-methyl diphenyl methane,
2,3-dimethyl diphenyl methane,
2,4-dimethyl diphenyl methane,
2,2′-dimethyl diphenyl methane,
2-methyl-3-ethyl-diphenyl methane,
2-methyl-4-ethyl diphenyl methane,
2-methyl-5-ethyl diphenyl methane,
2-methyl-6-ethyl-diphenyl methane,
2-methyl-2′-ethyl diphenyl methane,
2-methyl-3′-ethyl diphenyl methane,
2-methyl-4′-ethyl diphenyl methane,
2,3,4-trimethyl diphenyl methane,
2,3,5-trimethyl diphenyl methane,
2,3,6-trimethyl diphenyl methane,
2,3,2′-trimethyl diphenyl methane,
2,3,3′-trimethyl diphenyl methane,
2,3,4′-trimethyl diphenyl methane,
2,5,2′-trimethyl diphenyl methane,
2,5,3′-trimethyl diphenyl methane,
2,5,4′-trimethyldiphenyl methane,
2,3-dimethyl-2′-ethyl diphenyl methane,
2,3-dimethyl-3′-ethyl diphenyl methane,
2,3-dimethyl-4′-ethyl diphenyl methane,
2-methyl-3,2′-diethyl diphenyl methane,
2-methyl-3,3′-di-n-propyl diphenyl methane,
2-methyl-3,4′-di-n-butyl diphenyl methane,
2-methyl-5-ethyl-3′-isopropyl diphenyl methane,
2-methyl-5-iso-butyldiphenyl methane,
2-methyl-4-ethyl-4′-cyclohexyl diphenyl methane,
2-methyl-6-ethyl-3′-iso-propyl diphenyl methane,
2-methyl-5-n-propyl-4′-isooctyl diphenyl methane,
2-methyl-5-n-butyl-3′,4′-diethyl diphenyl methane,
2-methyl-3′,4′,5′-triethyl diphenyl methane,
2-methyl-3-iso-butyl-3′-n-butyl diphenyl methane,
2,3′,4′-trimethyl-4-n-pentyl diphenyl methane,
2,4-dimethyl-3′,5′-di-isopentyl diphenyl methane,
2-methyl-5-phenyl diphenyl methane,
2,4-diphenyl-4′-(4-methylphenyl)-diphenyl methane,
2,3′-dimethyl-5-naphthyl-diphenyl methane,
2-methyl-4-(2-methylphenyl)-3′,4′-dipropyl-diphenyl methane,
2,4-dimethyl-5-naphthyl-3′-diisopropyl diphenyl methane,
2,4,3′-trimethyl-3-ethyl-5′-(tert.)-butyl diphenyl methane,
2-methyl-4′-phenyl ethyl diphenyl methane,
2-methyl-3-ethyl-4′-phenylpropyl diphenyl methane,
2,4-dimethyl-3′-phenylbutyl diphenyl methane,
2-methyl-4-benzyl-3′,4′,5′-tributyl diphenyl methane,
2,2′-dimethyl-4,5-diethyl-5′-phenylethyl diphenyl methane,
2,3′-dimethyl-5-isobutyl-4′-benzyl-5,6′-diethyl diphenyl methane,
2-methyl-5-phenylpropyl-3-benzyl-4′,6′-diethyl-5′-(tert.)-butyl-diphenyl methane
2,3,2′-trimethyl-4-phenylbutyl-5,6-diethyl-4′-(4-methylphenyl)-diphenyl methane, 2,3-dimethyl-5-naphthyl-3′,5′-diisopropyl diphenyl methane.

The conversion of diphenyl methane derivatives into anthracenes of the Formula II can be illustrated by means of the following equations:

2-methyl diphenyl methane→anthracene+2H₂

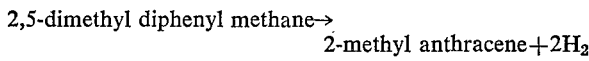
2,5-dimethyl diphenyl methane→
2-methyl anthracene+2H₂

During the conversions a hydrocarbon can be formed as a by-product, for example methane, corresponding to the equation:

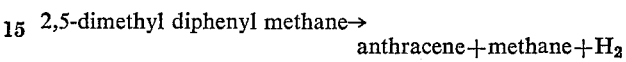
2,5-dimethyl diphenyl methane→
anthracene+methane+H₂

Side reactions can occur to a certain extent, for example according to the equation:

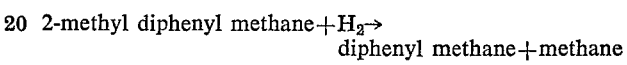
2-methyl diphenyl methane+H₂→
diphenyl methane+methane

The reaction can be carried out in the temperature range of about 400 to 800° C., preferable about 600 to 700° C., work being carried out at normal pressure, increased or reduced pressure. Work is preferably carried out at normal pressure or slightly increased pressure, e.g. about 1 to 3 atmospheres. The residence time can vary within a wide range. Suitable residence times lie between, for example about 0.1 to 100 seconds and preferably between about 1 to 10 seconds. It may be expedient to carry out the reaction in a turbulent gas stream. The thermal conversion can be carried out at a constant temperature in isothermal operation or at different temperatures in a range of 400–800° C. using an adiabatic or partly adiabatic method of working. The diaryl methanes can be completely reacted to anthracene in a single pass, for example at about 750° C. Methane, diphenyl methane and other cyclization products, e.g. fluorenes, are formed as side-products which can be separated from the anthracenes, for example by distillation.

The side-products can be separated by means of a suitable solvent from the crude anthracene, even after the reaction product has been cooled for example to about 100–250° C., and in this way the anthracene can be obtained in a particularly pure form. The solvent can be worked up by distillation and recycled into the process. The side-products can be burned as a source of energy. Methanol is, for example, a suitable solvent.

It is also possible to partly react the diphenyl methanes in a first pass, to separate the non-reacted diphenyl methane derivatives from the reaction product, e.g. by distillation, and to recycle unreacted starting material to the reaction in order to achieve a complete reaction.

A method of the technical performance of the process according to the invention can be illustrated for example with reference to the conversion of 2-methyldiphenyl methane to anthracene.

It is possible, for example, to evaporate 2-methyldiphenyl methane at normal pressure or slightly increased pressure with the addition of 0.01–0.1% by weight of carbon disulfide, to heat the gaseous starting product up to the reaction temperature of 650° C., to conduct it at this temperature through a reaction tube at a residence time of 0.1–100 seconds, subsequently to cool the gaseous reaction product for example to 100–250° C., to introduce the reaction product cooled to this temperature into a continuous distillation column in which the non-reacted methyl diphenyl methane is separated as the head product at normal or slightly reduced pressure, for example 100 mm. Hg, and recycled to the reaction, while the anthracene forming during the reaction is withdrawn at the sump or as a branch stream from the lower part of the column. It may be expedient, after cooling the gaseous reaction product to 100–250° C., to carry out separation in a separator into a liquid product, which consists substantially of methyl diphenyl methane and anthracene, and into a gaseous product, which consists substantially of hydrogen resulting from the reaction. By cooling to temperatures below 50° C. liquid methyl diphenyl methane contained in the hydrogen stream can be separated in liquid form from the gas phase and recycled to the distillation.

The reaction of dimethyl diphenyl methanes can be carried out as in the reaction of 2-methyl diphenyl methane. A mixture is obtained of anthracene and methyl anthracene. An exhaust gas consisting substantially of hydrogen and methane is also obtained.

The reaction of diphenyl methanes can be carried out in the presence of inert gases, such as nitrogen or methane. It may be expedient to perform the reaction in the absence of oxygen. The apparatus used in the reaction, in particular the preheater, the reactor and the cooler, can be made of steel, for example normal C steel or special steels.

By means of the measures according to the invention, the formation of carbon can be avoided which leaves deposits behind and clogs the apparatus, thus lowering the yield of anthracenes.

Anthraquinones can be prepared from the antracenes prepared in accordance with the invention.

EXAMPLE 1

370 g. of 2-methyl-diphenyl methane are pumped hourly into a steel tube which is electrically heated to 500° C. and has a length of 3 m. and an internal diameter of 6 mm. and in which evaporation and heating to 500° C. takes place. The methyl diphenyl methane vapors are conducted through a reaction tube of steel which is electrically heated to 600° C. and which has a length of 3 m. and an internal diameter of 6 mm., thereafter cooled to 150° C. and separated into a liquid phase consisting of anthracene and 2-methyl diphenyl methane and a gas phase consisting substantially of hydrogen. In the reaction product which is liquid at a temperature of 150° C. the content of the resulting anthracene, carbon and non-reacted 2-methyl diphenyl methane is determined. The experiments are carried out with the addition of different sulfur compounds to the starting product and in a comparison experiment without the addition of sulfur or sulfur compounds. The results of the experiments are given in the table below.

| Addition of sulfur in percent by wt. of the 2-methyl diphenyl methane used | In the form of— | Reaction products in g./h. | |
|---|---|---|---|
| | | Anthracene | Carbon |
| 0.00 | Without additive | 30 | 10 |
| 0.05 | Carbon disulfide | 42 | 0.0 |
| 0.05 | Elementary sulfur | 40 | 0.0 |
| 0.05 | Hydrogen sulfide | 41 | 0.0 |
| 0.05 | Methyl mecaptan | 40 | 0.0 |

In the experiment without the addition of sulfur or sulfur compounds, an increase in pressure occurs after 36 hours. On removal and cutting open of the reaction tube it is found to be clogged due to hydrogen deposits on the walls. In the experiments using sulfur or sulfur compounds, no carbon deposits are found in the reaction tube after a running time of 200 hours each.

EXAMPLE 2

Example 1 is repeated with the addition of 0.05% by weight of sulfur (based on the 2-methyl diphenyl methane used) in the form of carbon disulfide; the reaction temperature amounts however to 620° C. In addition, a 6 m. long reaction tube is used instead of the 3 m. long reaction tube used in Example 1. 95 g. of anthracene are formed hourly. Formation of carbon is not detected over a period of 200 hours.

EXAMPLE 3

The process is carried out as in Example 2, except that the reaction is carried out at 650° C. and the reaction product separated by distillation into non-reacted methyl diphenyl methane and anthracene, and the non-reacted methyl diphenyl methane recycled into the reaction. Over a period of 100 to 200 hours the following results are obtained:

| | G./h. |
|---|---|
| Fresh methyl diphenyl methane | 160 |
| Recycle methyl diphenyl methane | 210 |
| $CS_2$ | 0.4 |
| Anthracene | 147 |

No formation of carbon is detectable over a period of 200 hours.

EXAMPLE 4

The process is carried out as in Example 1, except that the reaction is carried out at 670° C. while using quartz as the reaction material. The results can be seen from the following table.

| Starting material | Addition of sulfur | Carbon deposits on the reactor walls after 10 hrs. |
|---|---|---|
| 2-methyl diphenyl methane | None | Yes. |
| Do | 0.1% by wt. $CS_2$ | No. |
| 2,5-dimethyl diphenyl methane | None | Yes. |
| Do | 0.1% by wt. $CS_2$ | No. |

EXAMPLE 5

350 g. of 2-methyl diphenyl methane with the addition of 0.05% by weight of carbon disulfide are pumped hourly into a steel tube electrically heated to 500° C. which has a length of 3 m. and an internal diameter of 6 mm.

The methyl diphenyl methane vapors are then conducted through a steel reaction tube electrically heated to 750° C. which has a length of 6 m. and an internal diameter of 6 mm., thereafter cooled to 150° C. and stirred into boiling methanol. The side-products go into solution while anthracene is obtained in suspended form. Hydrogen and small amounts of methane can be separated off as gas. Pure anthracene is recovered from the anthracene suspension by filtering and washing with methanol.

The methanol is recovered in a distillation column, a concentrate of the by-products, which consist of fluorene, 1-methyl fluorene, diphenyl methane and non-reacted 2-methyl diphenyl methane in methanol, being drawn off.

The space/time yield of anthracene is 100 g. of anthracene per liter of reaction space per hour at a conversion rate of 92%. The selectivity of the cyclization to anthracene is 80%. Carbon formation is not detectable within a period of 1000 hours.

EXAMPLE 6

The process is carried out as in Example 5, except that 2,5-dimethyl diphenyl methane is used as the starting material. After working up, a pure product consisting of anthracene and 2-methyl anthracene in a ratio of 1:1 is obtained with a space/time yield of 950 g. per liter of reaction space per hour.

No carbon formation is detectable within a period of 500 hours.

It will be appreciated that the instant specification and examples are set forth by way of illustration and not limitation, and that various modifications and changes may be made without departing from the spirit and scope of the present invention.

What is claimed is:

1. In the preparation of anthracenes by the thermal conversion of a 2-methyl diphenyl methane, the improvement which comprises effecting the thermal conversion in the presence of a small amount of sulfur in elementary or combined form.

2. The process according to claim 1, wherein the thermal conversion is carried out in the presence of about 0.001 to 1% by weight of sulfur in elementary or combined form.

3. The process according to claim 1, wherein the thermal conversion is carried out at a temperature of about 400 to 800° C.

4. The process according to claim 1, wherein the 2-methyl diphenyl methane has the formula

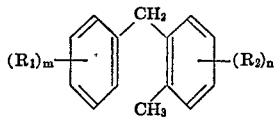

wherein $R_1$ and $R_2$ each independently is alkyl, aryl or aralkyl, $m$ is an integer from 0 to 5, and $n$ is an integer from 0 to 4, and the resulting anthracene has the formula

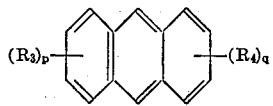

wherein $R_3$ and $R_4$ each independently is alkyl, aryl or aralkyl, and $p$ and $q$ each independently is an integer from 0 to 4.

5. The process according to claim 4, wherein $R_1$ and $R_2$ are methyl and $m$ and $n$ are 0 or 1.

6. The process according to claim 1, wherein the 2-methyl diphenyl methane is at least one of 2-methyl diphenyl methane, 2,3-dimethyl diphenyl methane, 2,4-dimethyl diphenyl methane, 2,5-dimethyl diphenyl methane and 2,6-dimethyl diphenyl methane.

7. The process according to claim 1, wherein the conversion is carried out in the presence of about 0.01 to 0.1% by weight of sulfur in elementary or combined form.

8. The process according to claim 1, wherein the conversion is carried out in the presence of sulfur in the form of carbon disulfide.

9. The process according to claim 1, wherein steel is used as the reactor material for the thermal conversion.

10. The process according to claim 6, wherein the conversion is carried out in a steel reactor at a temperature of about 400 to 800° C. in the presence of about 0.01 to 0.1% by weight of sulfur in the form of carbon disulfide.

References Cited

UNITED STATES PATENTS

| | | | |
|---|---|---|---|
| 2,889,381 | 6/1959 | Scott et al. | 260—668 F |
| 3,255,209 | 6/1966 | Teplitz | 260—668 F |

FOREIGN PATENTS

| | | | |
|---|---|---|---|
| 253,911 | 8/1927 | Great Britain | 260—670 |

CURTIS R. DAVIS, Primary Examiner

U.S. Cl. X.R.

260—670